US012001577B1

(12) United States Patent
Xiong et al.

(10) Patent No.: US 12,001,577 B1
(45) Date of Patent: Jun. 4, 2024

(54) ENCRYPTED MACHINE LEARNING MODELS

(71) Applicant: Amazon Technologies, Inc., Seattle, WA (US)

(72) Inventors: Yuanjun Xiong, Seattle, WA (US); Jia Bi Zhang, Kirkland, WA (US); Bing Shuai, Seattle, WA (US); Juan Pablo Escalona Garcia, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 17/491,380

(22) Filed: Sep. 30, 2021

(51) Int. Cl.
*G06F 21/62* (2013.01)
*G06N 3/04* (2023.01)
*H04L 9/00* (2022.01)

(52) U.S. Cl.
CPC ........... *G06F 21/6218* (2013.01); *G06N 3/04* (2013.01); *H04L 9/008* (2013.01)

(58) Field of Classification Search
CPC ........ G06F 21/6218; G06N 3/04; H04L 9/008
See application file for complete search history.

(56) References Cited

U.S. PATENT DOCUMENTS

| | | | |
|---|---|---|---|
| 2019/0164056 A1* | 5/2019 | Hoshizuki | H04L 9/008 |
| 2019/0278895 A1* | 9/2019 | Streit | G06N 3/08 |
| 2019/0334716 A1* | 10/2019 | Kocsis | G06N 3/045 |
| 2020/0014541 A1* | 1/2020 | Streit | H04L 63/0861 |
| 2020/0017117 A1* | 1/2020 | Milton | G08G 1/0112 |
| 2020/0028824 A1* | 1/2020 | Baughman | H04L 9/088 |
| 2020/0044852 A1* | 2/2020 | Streit | H04L 9/3231 |
| 2020/0119969 A1* | 4/2020 | Niederfeld | H04L 67/12 |
| 2020/0204341 A1* | 6/2020 | Williams | H04L 9/008 |
| 2020/0228336 A1* | 7/2020 | Streit | H04L 9/008 |
| 2020/0233979 A1* | 7/2020 | Tahmasebi Maraghoosh | G06N 3/04 |
| 2020/0235908 A1* | 7/2020 | Hiromasa | G06N 3/048 |
| 2020/0320206 A1* | 10/2020 | Cammarota | G06F 21/57 |
| 2020/0327454 A1* | 10/2020 | Chuang | G06N 20/10 |
| 2020/0358611 A1* | 11/2020 | Hoang | H04L 9/3231 |
| 2021/0133577 A1* | 5/2021 | Srinivasan | G06N 20/00 |
| 2021/0135837 A1* | 5/2021 | Cheung | H04L 9/008 |
| 2021/0241166 A1* | 8/2021 | Horesh | G06F 21/602 |
| 2021/0312725 A1* | 10/2021 | Milton | G07C 5/008 |
| 2021/0391987 A1* | 12/2021 | Badrinarayanan | H04L 9/3247 |
| 2022/0067181 A1* | 3/2022 | Carley | G06N 20/00 |
| 2022/0108177 A1* | 4/2022 | Samek | G06N 3/045 |
| 2022/0109574 A1* | 4/2022 | Narumanchi | H04L 9/3242 |
| 2022/0182239 A1* | 6/2022 | Hassanzadeh | H04L 9/0866 |
| 2022/0197994 A1* | 6/2022 | Sternby | G06F 21/54 |

(Continued)

OTHER PUBLICATIONS

Mihara, et al., "Neural Network Training With Homomorphic Encryption," arXiv preprint arXiv:2012, Dec. 29, 2020, 13 pages.

*Primary Examiner* — Gary S Gracia
(74) *Attorney, Agent, or Firm* — Davis Wright Tremaine LLP

(57) ABSTRACT

A machine learning model, such as a neural network, is partially encrypted with a homomorphic encryption scheme. Application of the machine learning model to data includes performing operations on plaintext and encrypting results of operations for input to other operations that are performed over cyphertext. Ciphertext output of such operations can be provided to a service that is able to decrypt the ciphertext output.

19 Claims, 9 Drawing Sheets

(56) References Cited

U.S. PATENT DOCUMENTS

2022/0271914 A1\* 8/2022 Diallo .................... H04L 9/065
2023/0084892 A1\* 3/2023 Bliss ........................ H04L 9/30
                                                        382/110

\* cited by examiner

ENCRYPTED MACHINE LEARNING MODELS

BACKGROUND

Training neural networks and other machine learning models can consume a lot of resources. For example, a major issue in machine learning is a lack of labeled training data. Often, large amounts of human effort are utilized to label training data to provide ground truth for training the models. Even with a robust set of labeled training data, the training itself often uses large amounts of computing resources, often utilizing large numbers of powerful processors. Protecting the effort that has gone into training a machine learning model can be cumbersome and difficult. For example, in some instances, it is desirable to distribute a machine learning model to various devices to enable inferencing or other processing to be performed at different locations. Doing so, however, can potentially enable devices with access to the machine learning model from obtaining the model parameters (e.g., neural network weights), possibly allowing unauthorized access to the result of a large expenditure of resources. While there are techniques that can be employed to prevent unauthorized access to a machine learning model, such techniques are complex and often can have adverse effects on performance (e.g., by adding additional latency).

BRIEF DESCRIPTION OF THE DRAWINGS

Various techniques will be described with reference to the drawings, in which.

DETAILED DESCRIPTION

Figure 1:
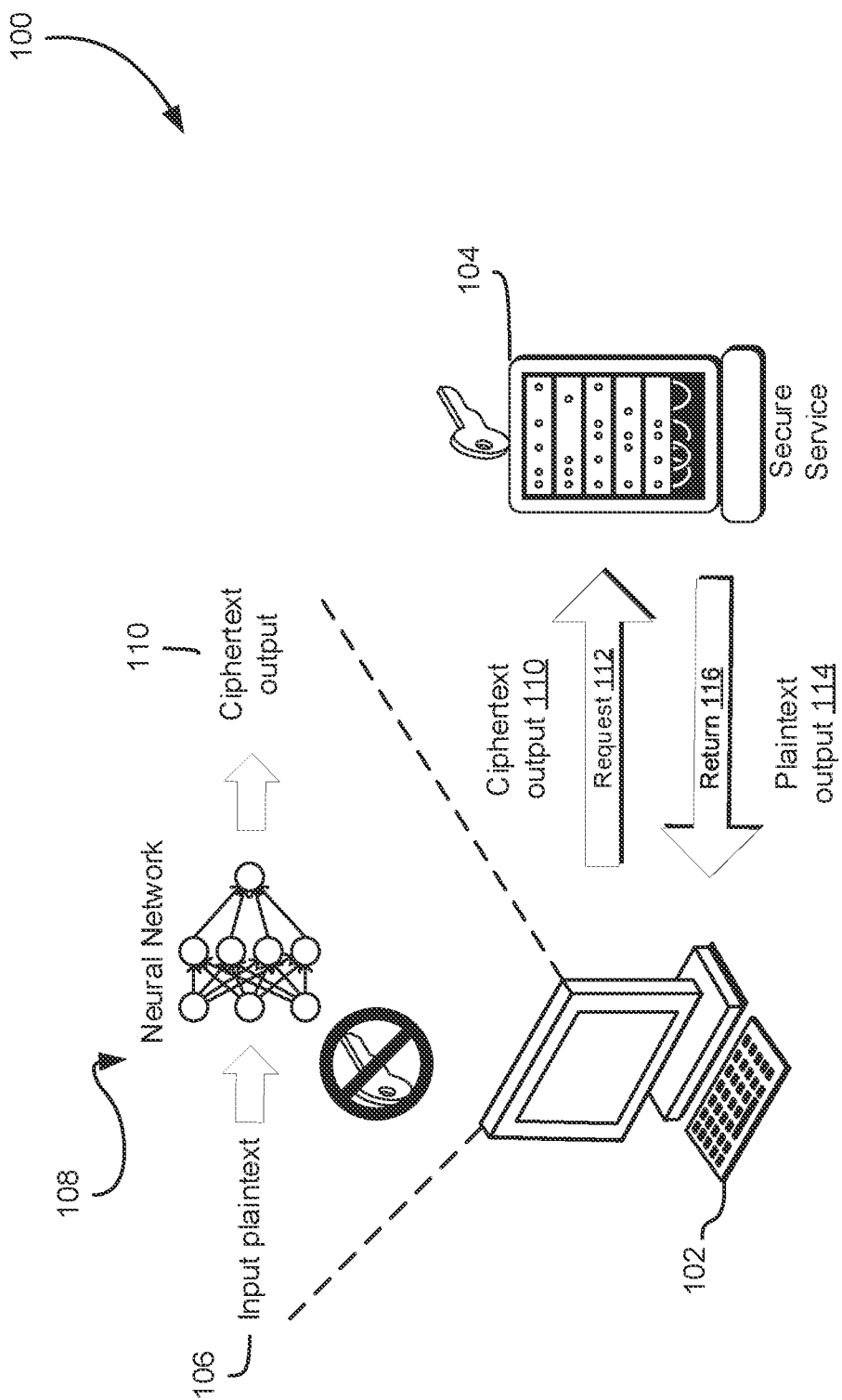
FIG. 1 illustrates a system that can be used to utilize techniques of the present disclosure, in accordance with at least one embodiment.

Homomorphic encryption is a technique that permits the performance of computations or functions on encrypted data (e.g., adding two numbers, where the numbers are encrypted when being added together) without first decrypting it. The computations or functions on the data remain in an encrypted form. When the data is decrypted, the result is the identical output had the computations or functions been performed on the unencrypted data. It can be used for privacy preserving computation and secure transfer of data between users and/or devices.

To protect proprietary machine learning models against intellectual property theft, various techniques described below use a homomorphic encryption scheme to encrypt a portion of a machine learning model, such as one or more layers of a neural network. Plaintext input data to be input to the encrypted portion of the model is likewise encrypted using the homomorphic encryption scheme. With the plaintext input data and portion of the machine learning model encrypted, computations can be performed over the encrypted input data and the encrypted portion of the model without decrypting either. Similarly, if output from such operations are to be input into another encrypted portion of the machine learning model, additional computations involved with the other portion of the machine learning model can be performed without decryption. In this manner, computations can be performed by a device without providing the device the ability to determine what the underlying portions of the model are in plaintext form.

To obtain plaintext from the result of performing computations on ciphertext, the ciphertext results can be provided to an entity with access to a key suitable for decrypting the ciphertext. The entity can be, for example, a web service that services requests to decrypt ciphertext, where a server in the service has a private key of a public/private key pair, where the private key can be used to decrypt the ciphertext. The entity can also be a trusted execution environment of the device that performed the operations on the ciphertext, where the secure execution environment unexportably stores a suitable key to decrypt the ciphertext and that can use the key to decrypt the ciphertext. In other words, a device lacking cryptographic material to decrypt the ciphertext can nevertheless perform operations (e.g., inferencing) without access to at least some plaintext components of the machine learning model. Such techniques allow the compute-heavy parts of a machine learning system, e.g., the machine learning model, to be run on arbitrary computing devices capable of executing the model but involve the plaintext output being retrieved from the secure service and/or trusted environment.

On an edge device, an application implementing the machine learning model obtains inputs to the model. The application selects, as it performs computations with the machine learning model, selectively encrypts data and performs computations over ciphertext that includes encrypted portions of the model. In this manner, the application can perform faster, less computationally expensive operations on plaintext that comprises less sensitive data (e.g., standard convolutional layers in a convolutional neural network) while maintaining the security of more sensitive parts of the model by performing computations over ciphertext. In some instances, the machine learning model has multiple layers and, thus, may obtain plaintext outputs of one portion of the model and encrypt those outputs as part of preparing inputs to another portion of the model.

In some examples, the first portion of the machine learning model comprises a set of layers of a neural network and the second portion of the machine learning model comprises a set of second layers of the neural network. The second portion of the machine learning model comprises neural network components that are individually encrypted. The components can be numeric values which are multiplied with inputs. Example components are weights of a neural network or other parameter values of a machine learning model, logical organizations of weights (e.g., vectors, matrices, or tensors of weights), or other data that controls some aspect of a machine learning model.

In some examples, once the data has flowed through the machine learning model completely, the output data will be comprised of partially encrypted and partially plaintext output data. For example, the output of the machine learning model may comprise plaintext that structures the output data (e.g., in the form of a vector or array) which the individual components of the output data being encrypted.

The device using the machine learning model can lack an ability to decrypt the output data that is encrypted. The device may, for example, lack sufficient cryptographic material to decrypt the encrypted data. In some example, the device can submit a request over a network to a secure service to decrypt the partially encrypted output data. The secure service and/or trusted environment can then decrypt the partially encrypted output data into corresponding plaintext output data. The secure service may add noise to the plaintext output to obfuscate it. This allows the secure service to preserve the security of the machine learning model with respect to unauthorized access by increasing the difficulty in calculating the components of the neural network or other model parameters based on the plaintext inputs and outputs. The service can then send the plaintext output data back to the edge device over network. The user is then able to use the plaintext output data.

As one skilled in the art will appreciate in light of this disclosure, certain embodiments may be capable of achieving certain advantages, including some or all of the following: (1) improving security, (2) mitigating and resolving data theft, (3) providing secure transfer of data across users and devices, (4) provides alternate decryption mechanisms (e.g., decryption in secure environment enclave located on edge device or over network to external secure service) thereby increasing user flexibility, (5) improving the security of the machine learning model, (6) improving the security of the decryption key, and (7) simplified user interface (e.g., the machine learning model selects which data needs to be encrypted).

In the preceding and following description, various techniques are described. For purposes of explanation, specific configurations and details are set forth to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a system 100 that comprises a client computer system 102 and a secure service 104. In an embodiment, a client computer system 102 (sometimes referred to herein simply as a user or client) may be a computing device such as a personal computer, a tablet computer, smart phone, a notebook computer, or the like. The client computer system can be, for example, a client device such as described in connection with FIG. 9. The secure service system 104 may be a server or secure cloud environment. The secure service system 104 can be, for example, a web server(s) or application server(s) such as described in connection with FIG. 9.

A machine learning model, in an embodiment, is stored on client computer system 102. In an embodiment, the machine learning model comprises software instructions that, when executed by one or more processors, cause the one or more processors to generate information according to a model encoded by the software instructions based on input plaintext 106. The input plaintext can be different types of data in different implementations of the present disclosure. The input plaintext 106 can be, for example, an 2D or 3D image, a 2D or 3D video clip, an audio clip, time series data, combined audio and video, a point cloud, text, computer code (e.g., source code, machine code, or a page encoded in a markup language), data suitable for other types of models described herein, or generally any data upon which inferencing can be performed, including combinations of different types of data. The machine learning model, for example, can have a neural network 108 that is partially encrypted. In some instances, the machine learning model can fall into either a supervised learning, unsupervised learning, or reinforcement learning category.

Supervised learning machine learning models map inputs to outputs based on past training with labeled data sets. The labeled data sets include inputs and correct outputs, which allows the model to learn over time. Machine learning models are often trained and learn by means of a loss function, which is designed to reduce error in the models' predictions. A loss function is a measure of how good a prediction model does in terms of being able to predict the expected outcome. In other words, a loss function measures how well the machine learning model models the data set. Loss functions can fall into two major categories: regression losses and classification losses. Regression loss functions predict a continuous value or quantity. Types of regression loss functions that can be used with the techniques described herein include Mean Square Error/Quadratic Loss, Mean Absolute Error, Huber Loss/Smooth Mean Absolute Error, Log cosh Loss, Quantile Loss, etc. Classification loss functions predict a label. Types of classification loss functions that can be used with the techniques described herein include Log Loss, Focal Loss, KL Divergence/Relative Entropy, Exponential Loss, Hinge Loss, etc.

Supervised learning machine learning models infer a function from the labeled data sets, which can be used for mapping new inputs. Types of supervised learning models that can be used with the techniques described herein include linear regression, support-vector machines, logistic regression, Naïve Bayes, decision trees, random forest, neural networks, binary classification, multiclass classification, etc. Applications of supervised machine learning models can include image and object recognition, predictive analysis for businesses, consumer analysis, etc.

Neural networks are comprised of node layers, which contain an input layer, one or more hidden layers, and an output layer. Each hidden layer node is comprised of a weight, which can be a numeric value. Types of neural network architectures to which the techniques described herein can be applied include Perceptron, Feed-Forward (FF), Radial Basis Network (RBF), Deep Feed Forward (DFF), Recurrent Neural Network (RNN), Long Short Term Memory (LSTM), Gated Recurrent Unit (GRU), Auto Encoder (AE), Variational Auto Encoder (VAE), Denoising Auto Encoder (DAE), Sparse Auto Encoder (SAE), Markov Chain (MC), Hopfield Network (HN), Boltzmann Machine (BM), Restricted Boltzmann Machine (RBM), Deep Belief Network (DBN), Deep Convolutional Network (DCN), Deconvolutional Network (DN), Deep Convolutional Inverse Graphics Network (DCIGN), Generative Adversarial Network (GAN), Liquid State Machine (LSM), Extreme Learning Machine (ELM), Echo State Network (ESN), Deep Residual Network (DRN), Kohonen Network (KN), Support Vector Machine (SVM), Neural Turing Machine (NTM), etc.

At some point during inferencing, output of one layer is to be input into another layer where the other layer is encrypted. To do this, the machine learning model sends the input for the other layer through a homomorphic encryption scheme. The machine learning model then performs computations on the ciphertext input and layer comprising ciphertext.

In contrast, unsupervised learning models learn patterns from unlabeled data. The models discover hidden patterns or data groupings without the need for human intervention or labeled data sets. Types of unsupervised learning models include clustering and association. Clustering unsupervised machine learning models can include hierarchical clustering, K-means clustering, Principal Component Analysis, Singular Value Decomposition, Independent Component Analysis, etc. Association unsupervised machine learning models can include Apriori algorithm, Eclat algorithm, FP-growth algorithm, etc. Applications of unsupervised machine learning models include object recognition, medical imaging, categorizing news articles, etc.

Reinforcement Learning machine learning models learn patterns from trial and error, wherein the agent may receive a reward for correctly evaluating a task, where the reward is a value or other set of values used to represent correct evaluation. The model's goal is to maximize the total reward. Typical algorithms for reinforcement learning include criterion of optimality, brute force, value function, direct policy search, Q-Learning, etc. Application of reinforcement learning machine learning models can include computer games, dialog agents (text, speech), robotics, etc.

As described in FIG. 1, the neural network 108 may have multiple layers and each layer comprises sequences of operation, wherein the output of one layer and operation can be used as input to another layer and operation. The neural network 108 partially encrypts the input plaintext 106 into ciphertext output 110, which comprises both partial ciphertext and partial plaintext output data. Examples of input data may include images, video files, video frames, sound clips, items from time series, or combinations of the above. The client receives the ciphertext output 110 from the neural network 108.

The encryption function, in an embodiment, is encryption according to a homomorphic encryption scheme. The homomorphic encryption scheme can be fully homomorphic, somewhat homomorphic, partially homomorphic, or otherwise homomorphic in the sense that operations to be performed can be performed over ciphertext values without decrypting the values. Fully homomorphic encryption schemes are designed to allow performance of calculations in cipher space as if the calculations were performed on plaintext. Fully homomorphic encryption schemes allow performance of multiple types of operations, such as addition and multiplication, and computation of functions, such as linear and polynomial operations, in ciphertext space an unlimited number of times. Generally speaking, a homomorphic encryption scheme allows functions to be evaluated in cipher space (i.e., over ciphertexts) such that the input to a function can be one or more ciphertexts and output of the function comprises one or more ciphertexts, and evaluation of the function lacks any operations to decrypt the ciphertexts involved. For such functions, ciphertext output can be decrypted to obtain plaintext output that is equivalent (e.g., the same) to output that would be obtained if the equivalent function was performed over plaintext input. Note that the specific manner of evaluating a function over ciphertext can be different than the manner of evaluating the equivalent function over plaintext. For example, many homomorphic encryption schemes allow addition (i.e., where a function evaluates a sum of inputs). Processor executable code (instructions) to add plaintext inputs can be different than processor executable code to add ciphertexts to ensure that the result of adding ciphertexts, when decrypted, is equivalent (e.g., equal) to the result of adding the corresponding plaintexts.

In some examples, for non-linear operations, a system utilizing techniques described herein can compute an approximation of the function in ciphertext space (i.e., over ciphertexts where inputs to the operation are ciphertexts and the outputs of the operation are ciphertexts). For example, for an exponential function, the fully homomorphic encryption scheme can approximate the function by a polynomial. In another example, a convolutional neural network that utilizes a Rectified Linear Unit (ReLU) can be approximated using low-degree polynomials in a fully homomorphic encryption scheme. Examples of fully homomorphic encryption schemes can include HElib, Microsoft SEAL, PALISADE, HEAAN, FHEW, SEAL-python, krypto, FV-NFLlib, Lattigo, etc. Many fully homomorphic encryption schemes utilize the CKKS scheme. A CKKS scheme can encrypt a vector that represents coefficients of a polynomial and allows addition of polynomials homomorphically. This scheme encrypts approximate values instead of exact values, which results in more efficient rounding operations and is used for encrypted machine learning. Fully homomorphic encryption schemes that utilize the CKKS scheme can include HElib, Microsoft SEAL, PALISADE, HEANN, Lattigo, etc.

Somewhat homomorphic encryption schemes are capable of performing multiple operations on cipher text, such as addition and multiplication, but only for a limited number of addition and multiplication operations. Examples of somewhat homomorphic encryption schemes can include BGV, FV, NTRU, and YASHE. Partially homomorphic encryption schemes are capable of performing only one operation on the cipher text, either addition or multiplication but not both. Examples of multiplicative partially homomorphic encryption schemes can include the RSA cryptosystem and El-Gamal cryptosystem. Examples of additive partially homomorphic encryption schemes can include Benaloh, Goldwasser-Micali Cryptosystem, Paillier Cryptosystem, and Okamoto-Uchiyama Cryptosystem. It should be noted that the techniques described herein are extendible to additional types of cryptosystems where operations are performable on ciphertexts without description to obtain the same or otherwise equivalent results as if the operations were performed on the corresponding ciphertexts.

The client, via the client computer system 102, can send a request 112 to the secure service 104 to decrypt the ciphertext output 110. The request 112 can be, for example, a web service application programming interface (API) request or other request, such as described below. The secure service 104 contains the key for decryption. The secure service, in an embodiment, 104 receives the request from the client computer system 102. The secure service 104 decrypts the ciphertext output 110 data and transforms it into corresponding plaintext output 114 data. The secure service 104 returns the plaintext output 114 back to the client computer system 102 via return 116.

As illustrated in FIG. 1, in this example, the secure service 104 has a cryptographic key that allows the secure service to decrypt the ciphertext, whereas the client computer system 102 lacks sufficient cryptographic material to decrypt the ciphertext. This allows the data to be and remain secure and private to prevent, for example, unauthorized access to the components of a neural network or other parameters of a machine learning model by the client 102. The components may be vectors, matrices, tensors, other logical organizations of data items, individual data items (e.g., integer values, floating point values, values of other data types, etc. Generally, the components can be any type or data supported by the homomorphic encryption scheme being used.

Figure 2:
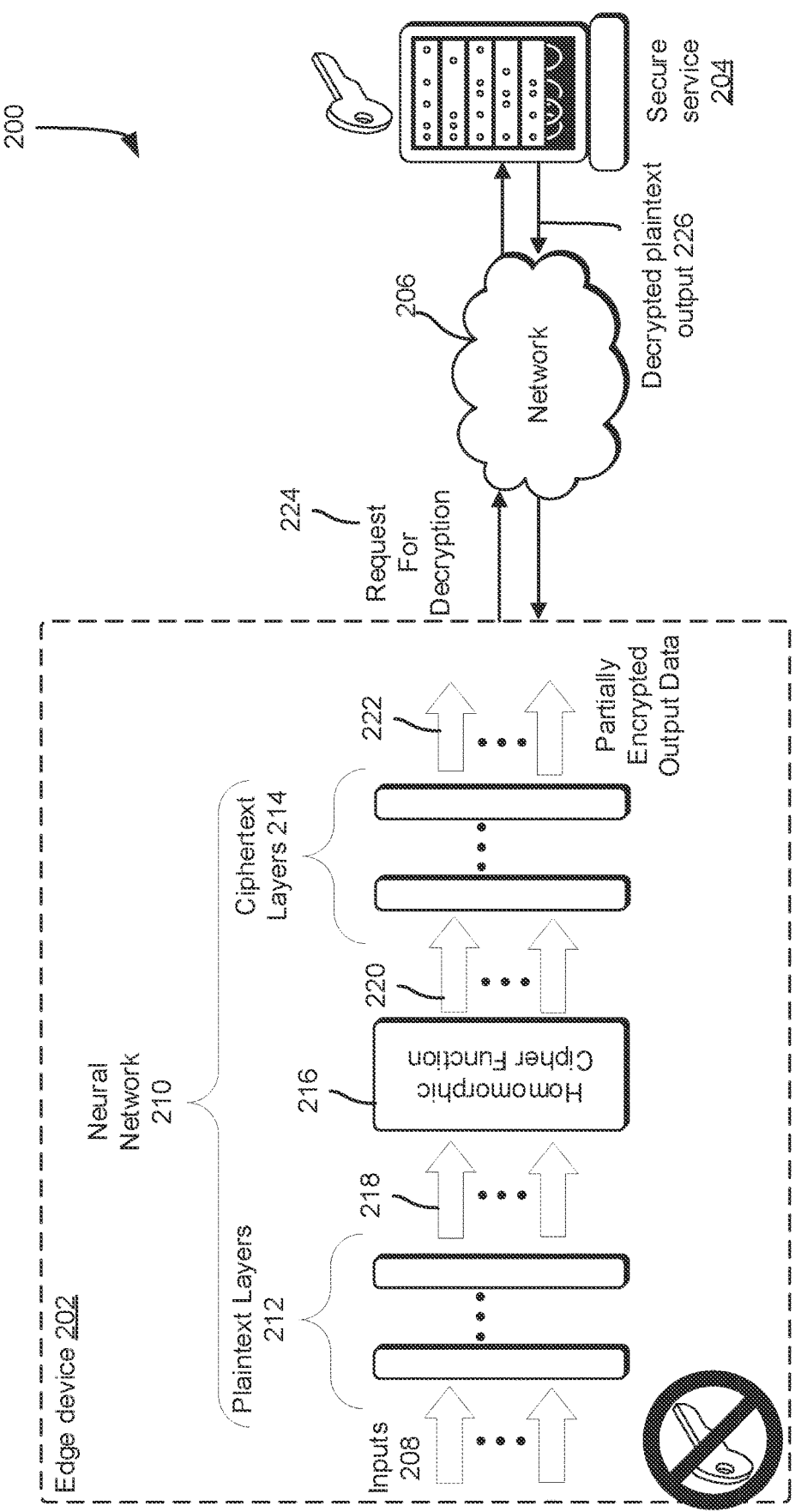
FIG. 2 illustrates a system, which can be the system of FIG. 1, that can utilize techniques of the present disclosure, in accordance with at least one embodiment.

FIG. 2 illustrates a system 200 that comprises of an edge device 202 that can perform the compute-heavy parts of a machine learning model system and a secure service 204. The edge device 202 can be, for example, the edge device discussed above in connection with FIG. 1. The secure service 204 may be a secure server, cloud environment, such as otherwise described herein. As discussed in more detail below, the secure server can be a component (e.g., secure execution environment) of the circuitry of the edge device 202. The secure service 204 can be, for example, the secure service discussed above in connection with FIG. 1. In an embodiment, the edge device is a laptop, a smart phone, an edge IoT device, or the like. The edge device 202 is capable of encrypting the input data but does not possess the decryption key. The edge device 202 may, for example, have a public key of a public/private asymmetric cryptographic key pair but lack an ability to access the corresponding private key. Symmetric cryptographic keys can also be used in some embodiments. The edge device 202 takes the inputs 208 data and a machine learning model to the inputs. The inputs 208 can be, for example, the input data discussed above in connection with FIG. 1.

In an embodiment, the machine learning model utilizes a neural network 210, which is partially encrypted, such as described in more detail below. In this example, the neural network 210 comprises a set of plaintext layers 212 and a set of ciphertext layers 214. In this context, a "layer" can be software instructions indicating a set of operations to be performed where output from one layer can be used as input to another layer. Operations can be performed in sequence, in parallel, or a combination of both. In some examples, the operations are ordered according to a graph structure, such as a directed graph where nodes represent operations and the edges indicate how output of an operation is to be used as input to another operation. The graph structure, for example, can be a directed acyclic graph (DAG) or, in some examples, can be cyclic, such as in the example of recurrent neural networks (RNNs).

In the example of FIG. 2, the plaintext layers 212 comprise a portion of the neural network 210 where the values (e.g., weights and/or other parameters) are in plaintext form on the edge device 202. The ciphertext layers 214, in an embodiment, comprise a portion of the neural network 210 where various components of the neural network are individually encrypted, but where the overall structure of the data remains in plaintext. For example, a component of the ciphertext layers 214 may comprise one or more vectors, matrices, and/or tensors having individual components (entries) that are individually encrypted. In this manner, software instructions are able to operate on the data according to the way the data is structured even if the individual data items are encrypted. The specific manner in which data of the ciphertext layers is encrypted will typically depend on the homomorphic encryption scheme used. In some examples, one or more (e.g., all) of the ciphertext layers are hidden layers of a neural network, although in some examples one or more layers of the neural network are non-hidden layers (e.g., convolutional layers).

As illustrated in FIG. 2, a homomorphic cipher function 216 is used to prepare output of plaintext layers 212 for being used as input into the ciphertext layers 214. The homomorphic cipher function 216 may comprise a set of software instructions executable by one or more processors of the edge device 202 to generate ciphertext inputs from plaintext outputs. The homomorphic cipher function 216 can correspond to a homomorphic encryption scheme utilized by the neural network 210. Examples of how input data and output data can be structured are described in more detail below. The homomorphic cipher function 216 can be, for example, a fully homomorphic cipher function.

The neural network 210, in this example, processes the inputs 208 through the first layers of the neural network to result in intermediate inputs 218, which can be output of the plaintext layers 212, sends the intermediate inputs 218 through the homomorphic cipher function 216, which results in partially encrypted input data 220. This partially encrypted output data 220 is made up of plaintext output data and ciphertext output data. Examples of partially encrypted output data are discussed in more detail below and include, for example, vectors, arrays, or other structures where the structure of the data is in plaintext, but where the components (e.g., components of a vector) are in ciphertext. Generally, the partially encrypted input data 220 comprises ciphertext values upon which the ciphertext layers 214 can operate without decryption of the ciphertext values. As with other examples described herein, plaintext of the partially encrypted input data 220 can be used to organize the data, such as by structuring according to a vector, matrix, tensor, or other such mechanism.

Upon operation on the partially encrypted input data 220 by the edge device using the ciphertext layers 214 of the neural network 210, the result is partially encrypted output data 222, in this example. The partially encrypted output data 222 can represent, for example, the output of inferencing of a neural network or other machine learning model. As illustrated in FIG. 2, the edge device in this example lacks cryptographic material to decrypt ciphertext of the partially encrypted output data 222. Accordingly, in this example, the edge device 202 lacks an ability to decrypt ciphertext of the partially encrypted output data 222.

To obtain the plaintext output, in an embodiment, the edge device 202 sends a request 224 for decryption of the partially encrypted output data over network 206. The network 206 can be, for example, a network such as described in connection with FIG. 9. The network may be any appropriate network, such as the Internet, intranet, a cellular network, and/or any combination thereof. The network may include one or more client computing devices, one or more servers, and/or clusters of severs interconnected with one another. The communication over the network may be performed over a wired or wireless connection. In an embodiment, the edge device 202 sends the request 224 over network, such as the Internet, via a wired or wireless connection. The request can be a web service application programming request or other request structured according to the interface to which the request is made.

Various types of request are also possible within the scope of the present disclosure. In one example, the request includes each of a plurality of individually encrypted values and an API of the secure service is programmed to identify from the request the individually encrypted values and decrypt the individual encrypted values to result in plaintext values. In other examples, different individually encrypted output values can be sent in different request and the secure service will respond in turn. Requests may also include sufficient data to enable the secure service to perform the decryption operations. As an example, the request may include a field value indicating (e.g., by an identifier) a cryptographic key to use to decrypt the individually encrypted values and/or a cryptographic algorithm to use, such as when the secure service is able to use multiple homomorphic encryption schemes. The request can also include other information, such as information indicating how data is structured, authentication information to enable the secure service to determine whether the request is authentic and authorized to be fulfilled, and other such data.

As illustrated in FIG. 2, the secure service 204 holds the decryption key and, generally, cryptographic material sufficient to decrypt ciphertext in the request. In some examples, the secure service holds multiple different decryption keys (e.g., in a hardware security module or other such secure storage with secure cryptoprocessor). The secure service 204, upon determining that the request 224 can be fulfilled (e.g., the request is authentic and authorized) decrypts the partially encrypted output data 222 into corresponding decrypted plaintext output 226. The secure service 204 sends the decrypted plaintext output data 226 to edge device 202 over network 206. The edge device can then use the plaintext output data 226 as input into programming logic to determine operations to perform.

While FIG. 2 shows components (e.g., layers) of the neural network 210 in sequence, it should be noted that the techniques of the present disclosure apply to a wide range of neural network and machine learning architectures. Generally, application of a machine learning model to data can include multiple operations where, for at least some of the operations, the operations receive multiple inputs from different portions of the machine learning model and can provide their outputs to multiple different portions of the machine learning model. Some operations can be performed in parallel and others in sequence. Additionally, while FIG. 2 shows the ultimate inferencing output being in the form of partially encrypted output, alternative embodiments can apply decryption before completion of processing of the inputs to which the model is applied. As an illustrative example, application of a machine learning model can utilize the techniques described herein to encrypt inputs to a portion of the machine learning model that is encrypted using a homomorphic encryption scheme. Output of the portion of the machine learning model can be transmitted (e.g., via a request such as described above) to a secure server that decrypts ciphertext and provides plaintext in response. The plaintext can then be used as inputs to other parts of the model. Such an embodiment is useful, for example, when there are not sensitive portions of the neural network after the sensitive portions (e.g., output from a sensitive portion of the neural network is used as input to a non-sensitive portion). By decrypting before applying the non-sensitive portion of the machine learning model, calculations involving the non-sensitive portion can be performed in plaintext to conserve computational resources (e.g., compute capacity, memory, and other resources that are taxed more when performing operations on homomorphically encrypted data).

Figure 3:
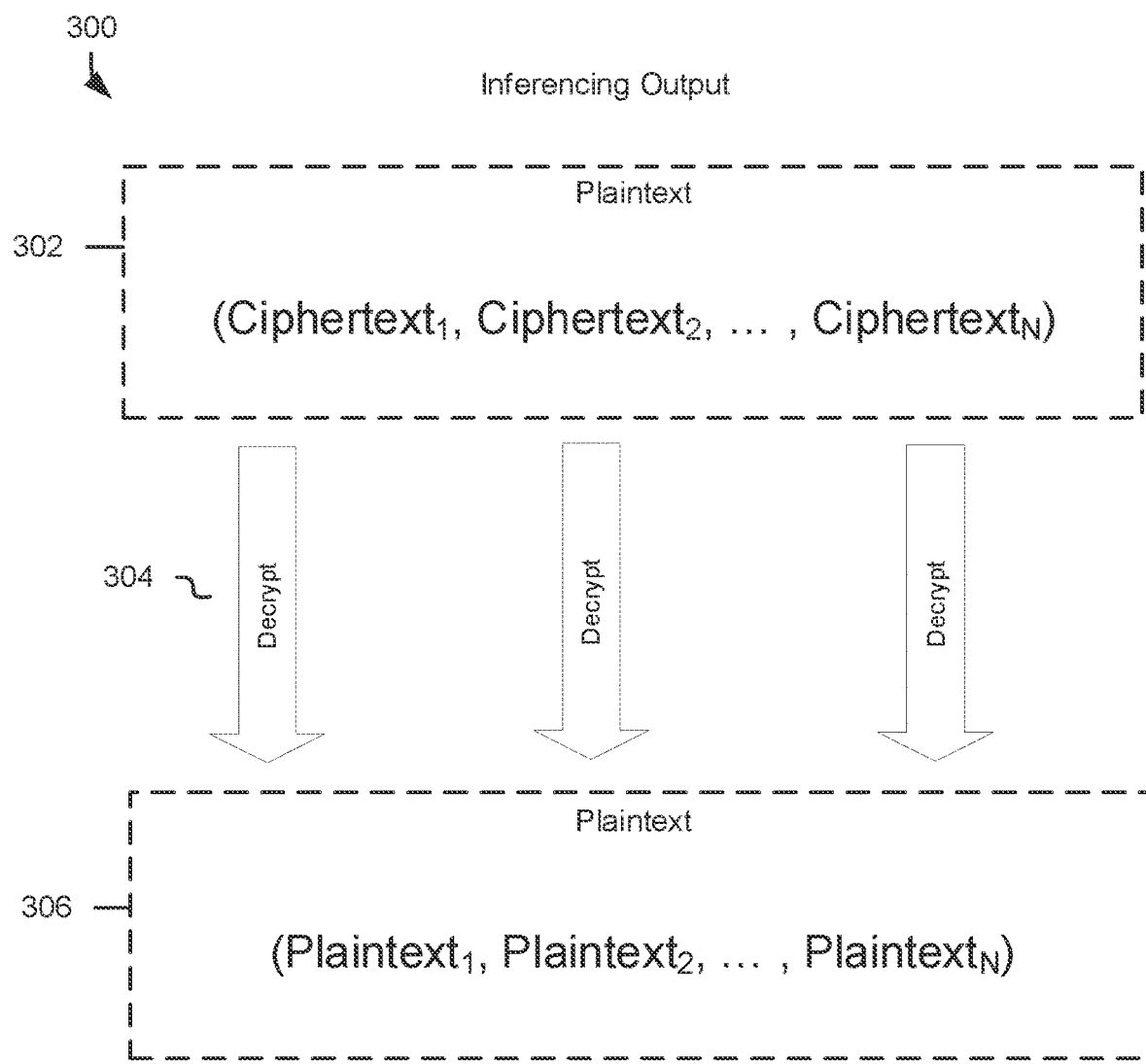
FIG. 3 illustrates a process for transforming the inferencing output of the machine learning model into corresponding plaintext output data via decryption, in accordance with at least one embodiment.

FIG. 3 illustrates a process 300 for transforming the inferencing output data 302 into plaintext data 306 through decryption 304. The process illustrated in FIG. 3 can be performed by a secure service, such as described above or any other suitable device. In one example, the inferencing output is the resultant output from a machine learning model, which may be a neural network. In this example, the output is in the form of a vector. The vector may comprise, for example, floating point numbers that represent probabilities that different potential inferencing outputs are correct (e.g., categories used by a classifier model). In this example, the output is a vector comprising N values, where N is a positive integer. In this example, each of the N values are separately encrypted for the purpose of application of a homomorphic encryption scheme. As an example, if Ciphertext$_1$ represents Value$_1$ in plaintext and Ciphertext$_2$ represents Value$_2$ in plaintext, then adding Ciphertext$_1$ and Ciphertext$_2$ can result in another ciphertext that, if decrypted, will yield the sum of Value$_1$ and Value$_2$ (assuming a homomorphic encryption scheme supporting addition is used.) The inferencing output is comprised of both ciphertext and plaintext data, which may have been performed in a neural network as described in FIG. 1. The ciphertext, in an example, was encrypted via a homomorphic encryption scheme as described in connection with FIG. 1. While FIG. 3 shows a vector, the output of a machine learning model can take many different forms and the techniques described herein can be adapted accordingly. The output may have components, for example, representing pixels, voxels, floating points, integers, matrices of values, tensors of values, one or more scalars, and/or other output.

A device that produced the inferencing output 302 (e.g., an edge device such as described above) can send the inferencing output 302 to a secure service in a request for decryption. The secure service can be, for example, the secure service discussed above in connection with FIG. 1. In some embodiments, the user may send the inferencing output 302 to a secure enclave located on the user's device. Upon receipt of the data, the secure service decrypts the inferencing output 302. Through this decryption 304, the ciphertext is decrypted into plaintext. The output 306 is then fully comprised of plaintext.

As illustrated in FIG. 3, in an embodiment, the output 306 is structured in the same way as the output 302, but with the components (e.g., entries in the vector) organized the same way. Plaintext$_1$, in the figure of this example, is the result of decrypting Ciphertext$_1$, Plaintext$_2$ is the result of decrypting Ciphertext$_2$, and so on. The vector of output 302 and the vector of the output 306 have the same dimension. Similarly, if the inferencing output 302 was in another form, with components of data structured the same way, the output 306 can have the same structure. However, in different embodiments, the structure of the plaintext and/or number of data items in the plaintext can differ from that of the ciphertext output 302. Such is useful, for example, to further obscure the structure of the machine learning model. To achieve such an effect, a secure service can be programmed to rearrange and filter data (e.g., by excluding some ciphertext components) and/or reordering values of the plaintext relative to their corresponding values of the ciphertext.

Figure 4:
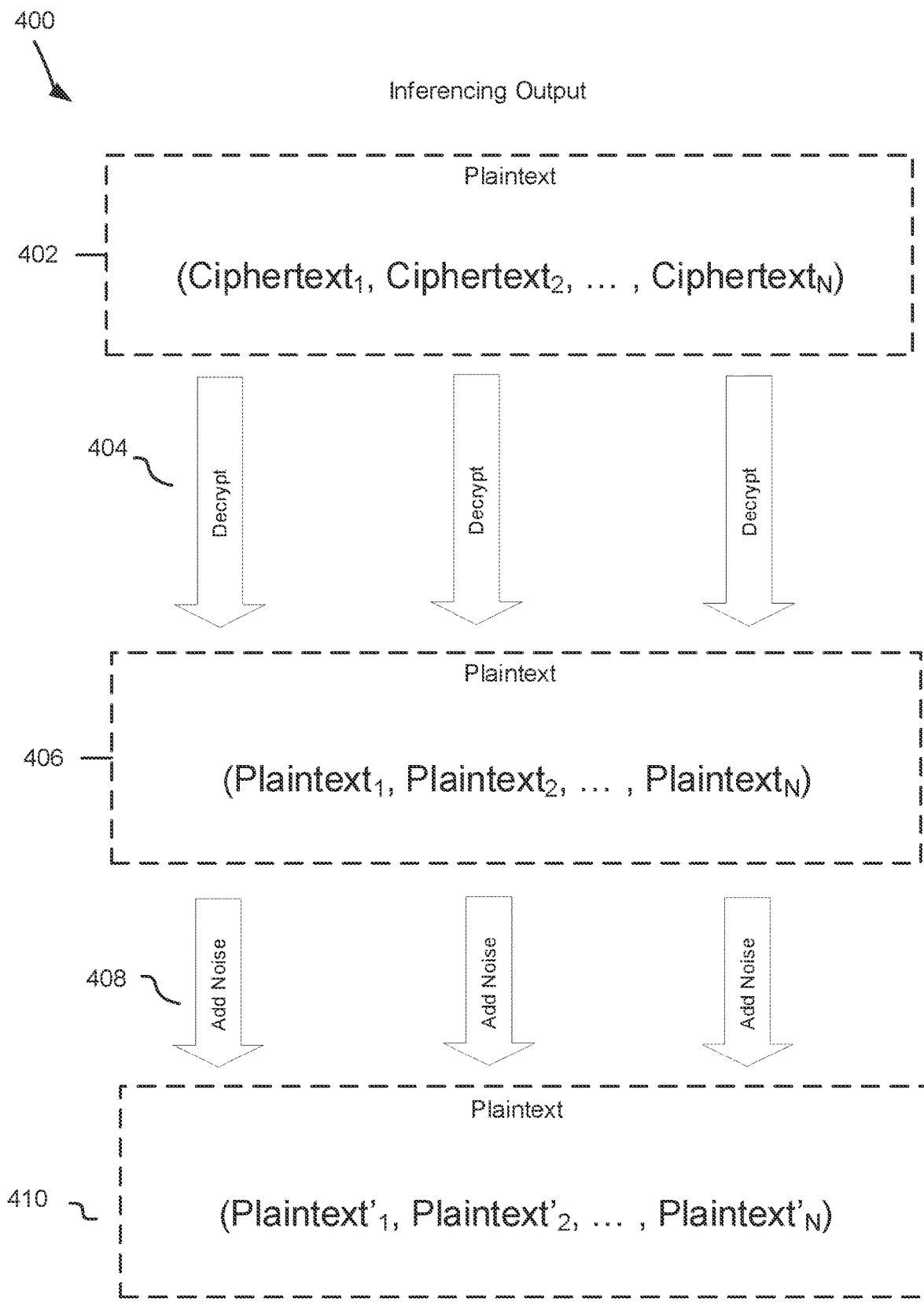
FIG. 4 illustrates adding noise to the decrypted plaintext output data to obfuscate the decrypted plaintext output data, in accordance with at least one embodiment.

FIG. 4 illustrates a process 400 of adding noise 408 to obfuscate the plaintext output 406. As described above in connection with FIG. 3, the process 400 can be performed by a device running a secure service or any suitable device. As described above in FIG. 3, the inferencing output is the resultant output of a machine learning model, which may comprise a neural network as described in FIG. 1. The inferencing output data 402 comprises plaintext and ciphertext which can be structured, such as discussed above in connection with FIG. 3. Through decryption 404, the ciphertext is decrypted into corresponding plaintext 406.

In some implementations, exposing decrypted output can have the ability to leak information about the encryption key and/or the encrypted portion of the neural network. A malicious user, for example, can gain information about the components of a neural network or parameters of other model by strategically selecting inputs that provide information about the encrypted portions of the machine learning model. To prevent exposing the encryption key or other sensitive data from the plaintext output to the client, the secure service may add noise 408 to the decrypted plaintext 406 data. The secure service can be, for example, the secure service discussed above in connection with FIG. 1. In another instance, the secure service may also add noise to the encrypted inferencing output 402 data before decrypting the data. The noise may be a small integer if the scheme is based on integers or a small polynomial if the scheme is based on polynomials. Generally, noise is a data compatible with the type of value (e.g., integer, floating point, etc.) being used and structured to change the values of the plaintext so that the change is within a specified threshold. In other words, in an embodiment, noise is data that is combined with the plaintext output of inferencing in such a manner as to insignificantly change the plaintext data so that, for example, the plaintext data indicates the same result (e.g., same category of a classifier) but in a different way (e.g., with slightly higher or lower probability). The noise, in some embodiments, is randomly generated to ensure the security of the encryption scheme.

In another embodiment, noise may be added by the machine learning model during inferencing while the input data is being encrypted. In this instance, the secure service that decrypts the inferencing output data would be unable to guess the components of the neural network. The noise prevents the client from discovering the decryption key and/or the components of the neural network used for encryption of the data and prevents a malicious user from exfiltrating plaintext machine learning models from CPU/GPU memory and using the models as is. This results in a more privacy preserving computation service.

Figure 5:
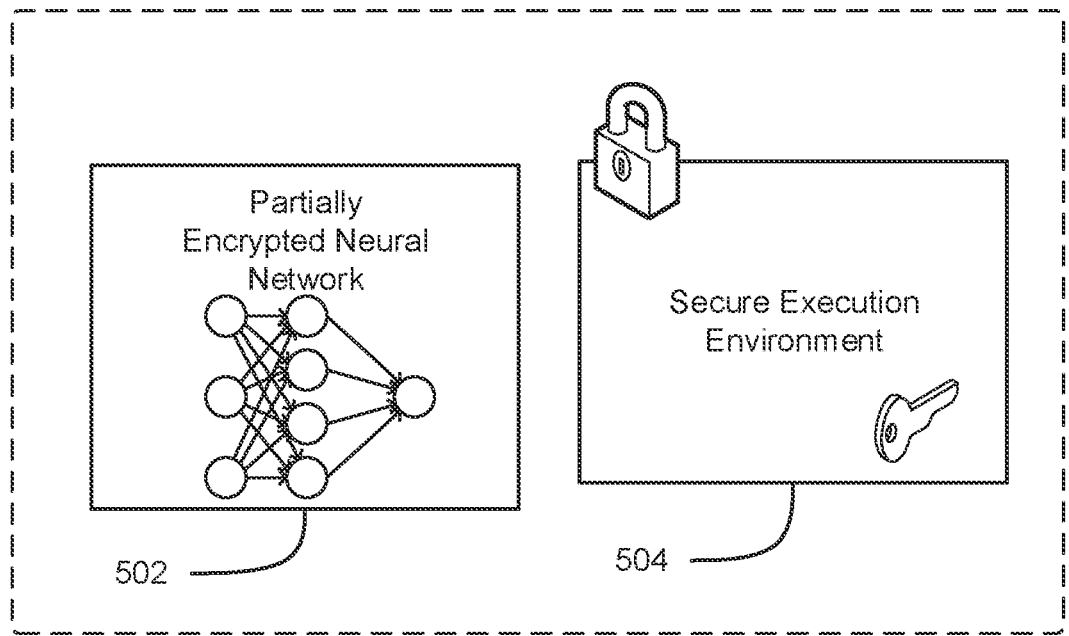
FIG. 5 illustrates an example device that comprises of a separate partially encrypted neural network and a separate secure execution environment that holds the decryption key, in accordance with at least one embodiment.
Figure 5:
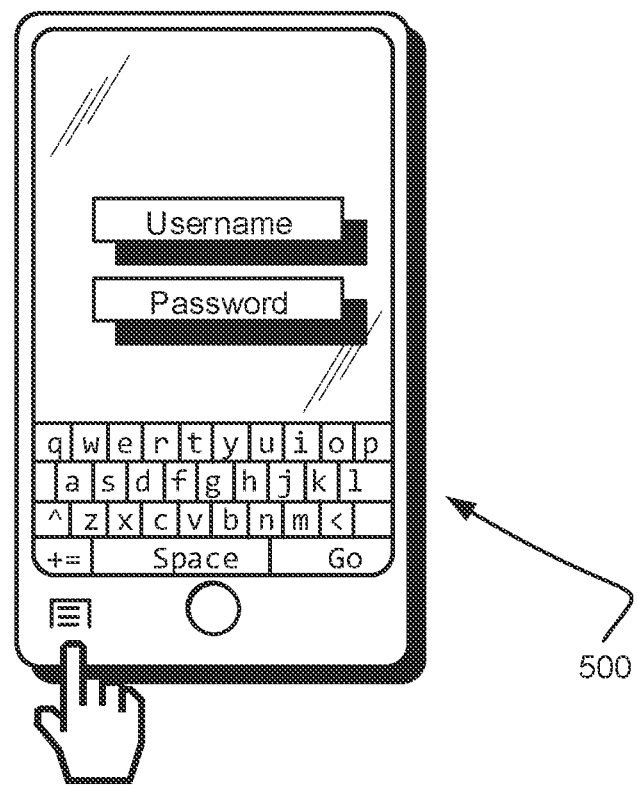

FIG. 5 illustrates an example device 500, which is illustrated as a smart phone system 500. The device 500 comprises (e.g., stored in memory) a machine learning model, which has a neural network 502 (or other machine learning model) component and a secure execution environment 504, which can also be referred to as a trusted execution environment (TEE). The neural network 502 can be, for example, the neural network discussed above in connection with FIG. 1. The secure execution environment 504 is a secure environment located in the smart phone system 500, wherein the user is unable to access the contents within the secure execution environment 504. The secure execution environment could be a chip inserted or installed in the device, a circuit of a chip, an Intel® SGX extension enclave, a Hardware Security Module (HSM), an ARM TrustZone, a device or component thereof meeting security level Profile 1 and Profile 2 of the Advanced Trusted Environment OMTP TR1 standard, a trusted platform module (TPM), a cryptoprocessor, and other such devices. The secure execution environment may have one or more programmatically unexportable cryptographic keys such that, for example, there is no programmatic way to cause the secure execution environment to export the cryptographic key(s) in plaintext form. The secure execution environment may be tamper proof such that, for example, physical intrusion to examine the circuits of the device may cause destruction of cryptographic material stored thereon. The secure execution environment may, for example, have a private key of a public/private key pair with a certificate issued by the manufacture of the secure execution environment. The secure execution environment 504, in the example of FIG. 5, contains cryptographic material sufficient to decrypt ciphertext encrypted according to a homomorphic encryption scheme used to encrypt values for the partially encrypted neural network 502.

The cryptographic material in the secure execution environment can be loaded onto the secure execution environment in various ways in accordance with various embodiments. In some examples, the device 500 and/or the secure execution environment 504 is manufactured to contain the cryptographic material. In another example, a server or other such device programmed to deploy the partially encrypted neural network can use a public key of the secure execution environment to encrypt the cryptographic material and load the encrypted cryptographic material onto the secure execution environment. In some examples, an application loaded on the device 500 is programmed to obtain a public key of the secure execution environment, transmit the public key of the secure execution environment to a server (e.g., a remote secure service, such as described above) in a request to provide the cryptographic material. In response, the server can use the public key to encrypt the cryptographic material and send the encrypted cryptographic material to the application which is programmed to then load the encrypted cryptographic material onto the secure execution environment where the secure execution environment can use a private key corresponding to the public key to decrypt the encrypted cryptographic material and subsequently use the decrypted cryptographic material to service request to decrypt output of the partially encrypted neural network (or other machine learning model).

In an embodiment, the neural network 502 component is partially encrypted and located in a separate environment on the device 500. The partially encrypted neural network 502 encrypts input data through a homomorphic encryption scheme and transforms the plaintext input data into corresponding partially encrypted output data, such as described above. The encryption process can be, for example, the process discussed above in connection with FIG. 1.

The partially encrypted output data can be decrypted in the secure execution environment 504 without exposing the decryption key to the device 500. In an embodiment, the device 500 lacks the ability to cause the secure execution environment to export the cryptographic material. This embodiment allows the user to encrypt and decrypt data within the closed device 500 without having to communicate with a remote service, which can involve additional latency and other inefficiencies. This embodiment allows a user to encrypt, process, and decrypt data without it leaving the device, thereby allowing the data to remain secure and private throughout the process.

Figure 6:
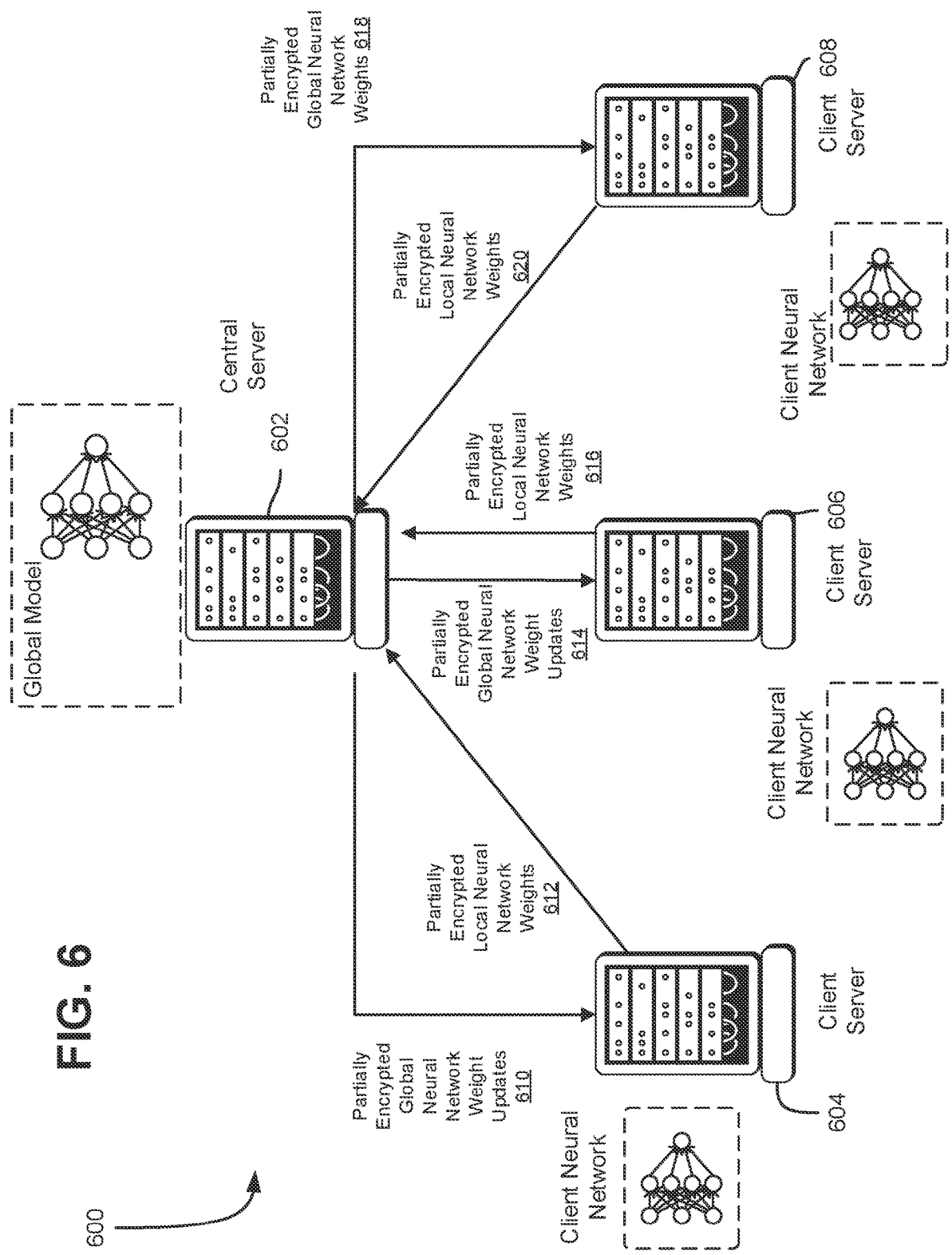
FIG. 6 illustrates an example environment of using encrypted neural networks for secure data transfer in a federated learning system, in accordance with at least one embodiment.

FIG. 6 illustrates an example embodiment comprising federated learning system 600 with central server 602. The central server 602 can be, for example, one or both of the servers shown in FIG. 9 and described below. Federated learning models can use a centralized server and machine learning model to train user's decentralized machine learning models, e.g. neural networks, wherein the user data is never sent to the centralized server. In this instance, the centralized server would maintain the global neural network and each decentralized user would be given a copy of the global neural network to train using its own dataset. The decentralized users would run its local data on its local copy of the global neural network and then send neural network weight updates back to the centralized server. The centralized server can aggregate all neural network weight updates from all decentralized users and update the global neural network model. The centralized server then sends the neural network weight updates to the decentralized users to update its local neural network model.

In an embodiment, the central server 602 comprises a global model neural network, which is at least partially encrypted. The central server global model sends neural network weights to client servers 604, 606, 608. Each client server contains a client neural network locally. The client server receives the neural network weights from the central server 602 via 610, 614, 618 and updates its client neural network with the partially encrypted neural network weights.

The client server runs its own local data on its client neural network and sends its partially encrypted neural network weight updates (612, 616, 620) to the central server 602. The central server 602 then processes and aggregates all partially encrypted neural network updates sent from the client servers and updates the neural network weights of the global model. The central server 602 sends the updated neural network weights back to the client servers so the client servers can continue local neural network use and training. The federated learning system shown in FIG. 6 can utilize various techniques described herein. For example, in some embodiments, the central server 602 has sufficient cryptographic material (e.g., a private key of a public/private key pair) to decrypt the partially encrypted local neural network weights. In this manner, the client servers can perform training operations using techniques described above (e.g., by performing operations on plaintext values until a plaintext value is needed as input into an operation involving ciphertext, in which case the client server can encrypt the value to perform the operations over ciphertext. In this manner, the client servers can perform training without access to the plaintext weights or other parameters of the machine learning model being trained. This is advantageous when it is not desirable to provide the client servers with the parameters, such as when the client servers are untrusted for the purpose of having access to the weights.

In another example, client servers can perform training utilizing techniques described above (e.g., operating on ciphertexts for portions of the machine learning model that are encrypted with a homomorphic encryption scheme). If some training operations are not performable on the ciphertexts (e.g., because doing so would not result in the same or otherwise equivalent values as if the operations were performed on plaintexts), the client server can send a request to decrypt to the central server or other system with access to a key to fulfill the request. The system able to fulfill the request can decrypt and provide the values, perhaps manipulated with noise such as described above. Such a technique is advantageous, for example, when evaluation of a loss function or another calculation in training is not performable over ciphertexts.

In other examples, the client servers each share cryptographic material to which the central server lacks access. The client computer systems can perform training operations locally, encrypt the results (e.g., neural network weights) and provide the results to the central server which can aggregate the results on the ciphertexts and provide ciphertext results of aggregation back to the client servers who can decrypt. Such a technique is advantageous when it is desirable to keep the weights from the central server, which can be, for example a part of a service that has sufficient compute power to perform the aggregations on ciphertexts more quickly than the client servers could do themselves. Other variations are within the scope of the present disclosure.

Figure 7:
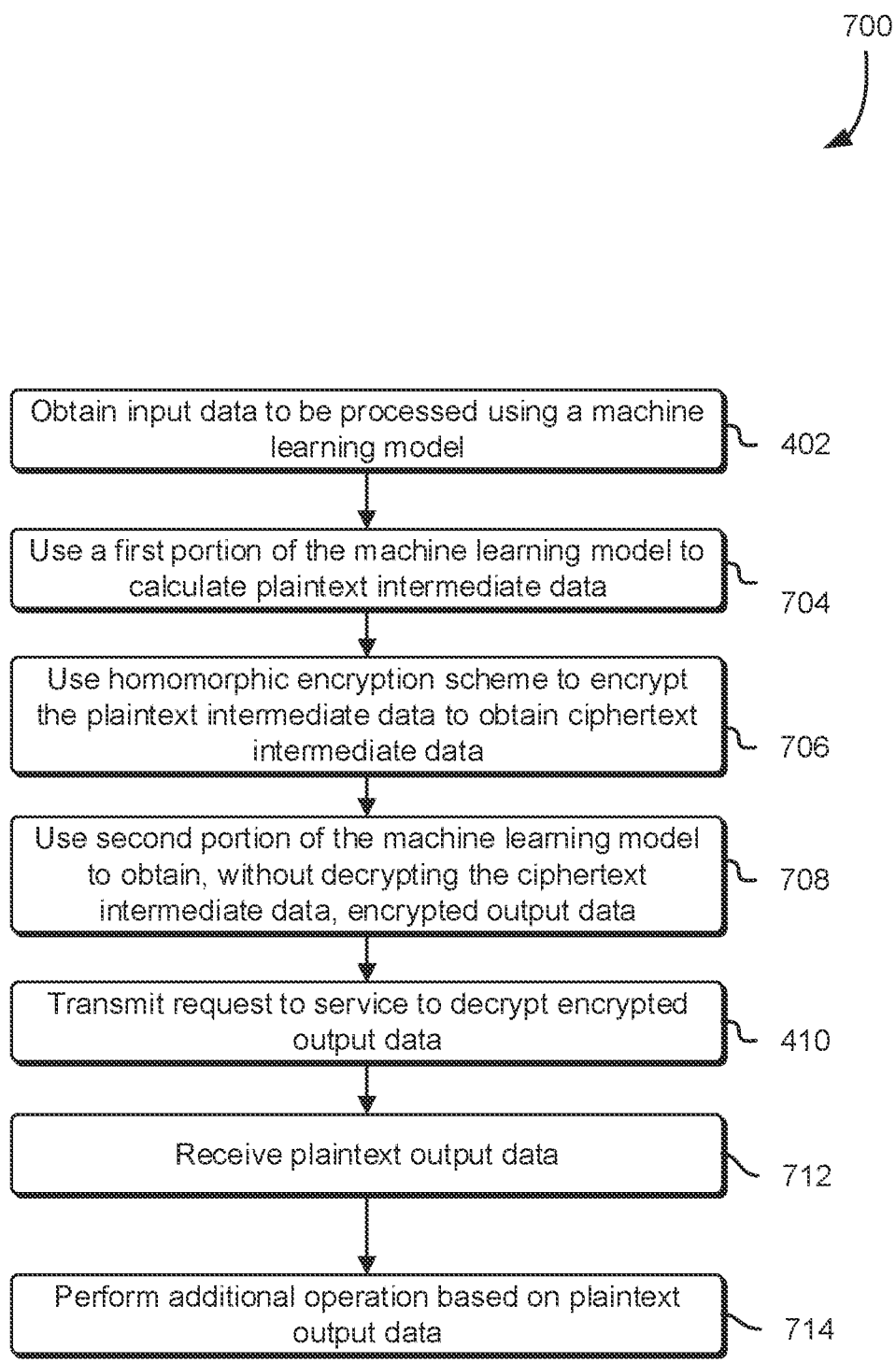
FIG. 7 illustrates a process to obtain output of a machine learning model, in accordance with at least one embodiment.

FIG. 7 shows an illustrative example of a process, in accordance with an embodiment. Some or all of process 700 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 700 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 700 is performed at least in part on a system such as those described elsewhere in this disclosure. Process 700 can be performed by a system such as an edge device.

In an embodiment, the process 700 comprises obtaining 702 input data to be processed using a machine learning model, the obtained input data being in plaintext form, such as described above. The input data can be, for example, inputs 208 described above in connection with FIG. 2. With the obtained input data, the process 700 can comprise using 704 a first portion of the machine learning model to calculate plaintext intermediate data, where the first portion of the machine learning model is in plaintext form and a second portion of the machine learning model is in ciphertext form according to a homomorphic encryption scheme, such as described above. The plaintext intermediate data can be, for example, outputs 218 described above in connection with FIG. 2. With the plaintext intermediate data obtained, the process 700 can comprise using 706 the homomorphic encryption scheme to encrypt the plaintext intermediate data to obtain ciphertext intermediate data. The ciphertext intermediate data can be, for example, outputs of the homomorphic cipher function 220 described above in connection with FIG. 2.

After obtaining the ciphertext intermediate data, the process 700 can comprise using 708 the second portion of the machine learning model to obtain, without decrypting the ciphertext intermediate data, encrypted output data according to the homomorphic encryption scheme. This can be performed by performing operations over ciphertexts, such as according to the ciphertext layers 214 discussed above in connection with FIG. 2. To obtain plaintext data indicating output of the machine learning model, the process 700 can comprise transmitting 710 a request to a service to cause the service to decrypt the encrypted output data and provide corresponding plaintext output data in response to the request. The request can be an application programming interface request to a remote service or instruction to a local secure execution environment or otherwise, such as described above.

In response to the request, the process 700 can include receiving plaintext output data in a response transmitted to fulfill the request. With the plaintext output data, the process 700 can include performing additional operations in accordance with the plaintext output data. A device performing the process 700 can, for example, execute programming logic (e.g., processor executable instructions) that depends on the plaintext output data. For example, a branch of instructions can be selected based on the plaintext output data. Other operations can also be performed, such as by displaying on a display information indicating the plaintext output data or otherwise providing information that indicates what the plaintext output data reveals about the input data.

Figure 8:
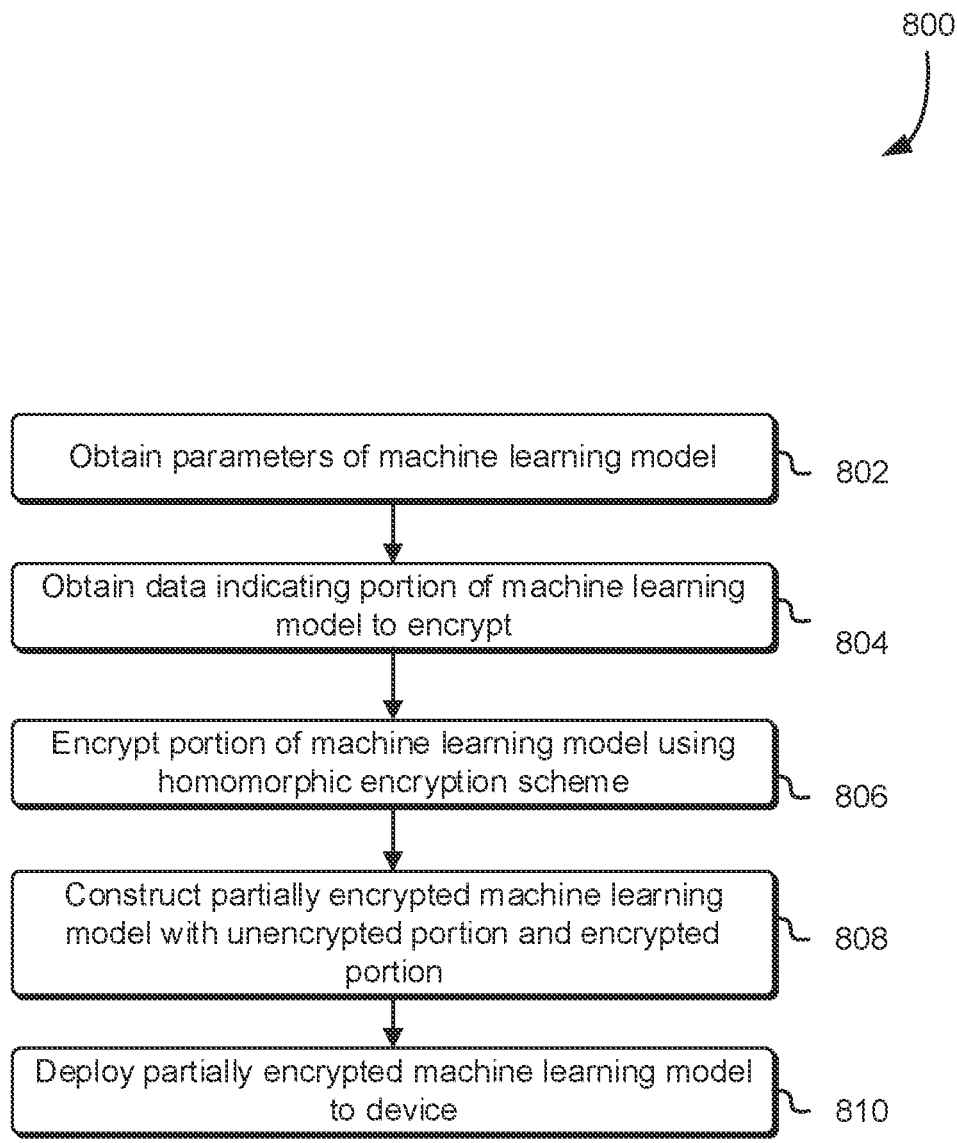
FIG. 8 illustrates a process to deploy a machine learning model, in accordance with at least one embodiment.

FIG. 8 shows an illustrative example of a process 800 for deploying a neural network to one or more devices in accordance with an embodiment. Some or all of process 800 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 800 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 800 is performed at least in part on a system such as those described elsewhere in this disclosure. Process 700 can be performed by a system that includes a secure service, such as described above. As an example, the process 800 can be performed by a distributed computer system (e.g., as described below in connection with FIG. 9 that performs operations that include distributing applications (e.g., mobile applications for mobile devices).

In an embodiment, the process 800 comprises obtaining 802 parameters of a machine learning model. The parameters can be weights of a neural network or other information that allows the machine learning model to be used to infer output from input. The parameters can be obtained in various ways, such as by receiving over a network, retrieving from data storage, training the machine learning model and calculating the parameters or otherwise. The process 800 can also include obtaining 804 data that indicates a first portion of a machine learning model to encrypt. The data can be obtained 804 in various ways in according with various embodiments. In one embodiment, a programmer programming the machine learning model can indicate a portion to encrypt in source code that programs the machine learning model. In another example, the data can be obtained 802 via a graphical user interface that illustrates graphically an architecture of the neural network and allows a user to select portions of the graphically illustrated architecture to encrypt. The information may indicate the portion in various ways, such as by identifying specific layers in a neural network or otherwise. In one embodiment, a file that stores the parameters, stores the parameters in a structured way to indicate by the structure of the data which portions (subsets of the parameters) should are to be encrypted.

In an embodiment, the process 800 comprises encrypting 806 the portion of the model using a cipher of a homomorphic encryption scheme. The homomorphic encryption scheme can be one of the ones listed above. A device perming the process 800 can then construct 808 the partially encrypted machine learning model with both the unencrypted portion and the encrypted portion. The construction can be done in various ways, such as by using a compiler and related tools to compile source code that defines the neural network. In one embodiment, the machine learning model is constructed by storing the plaintext parameters and ciphertext parameters in a file that is structured to indicate which parameters are which. In some examples, the file storing the parameters does not distinguish between plaintext and ciphertext, but executable code to execute the machine learning model is configured (e.g., compiled based on source code) according to whether data is plaintext or ciphertext. The executable code may, for instance, include instructions to perform operations over ciphertext for some portions of the model and instructions to perform operations over plaintext for other portions of the model. The file or a related file may contain executable code to operate on the parameters based on inputs. Generally, construction of the neural network can comprise packaging the plaintext and ciphertext parameters and may include additionally packaging the parameters with executable code to execute the machine learning model.

The process 800 can also include providing 810 the partially encrypted machine learning model to a device that lacks an ability to decrypt the encrypted portion of the partially encrypted machine learning model. This can be done in various ways in according with various implementations. For example, in one embodiment, a device performing the process 800 is part of a distributed computer system that operates a service that deploys applications to devices, such as an application store server or a server that manages software among multiple devices. Providing the partially encrypted machine learning model to a device can include providing the model in response to a request for the model, pushing the model to a device, or otherwise. In some examples, the model is provided as part of an application that uses the model for some of its operations. Providing the partially encrypted machine learning model can also comprise providing a public key of a public/private key pair to the device to enable the device to encrypt data so that operations can be performed over ciphertext, such as described above. In other examples, the device obtains the public key separately from the partially encrypted machine learning model, such as separately from the system performing the process 800 or from another system.

Figure 9:
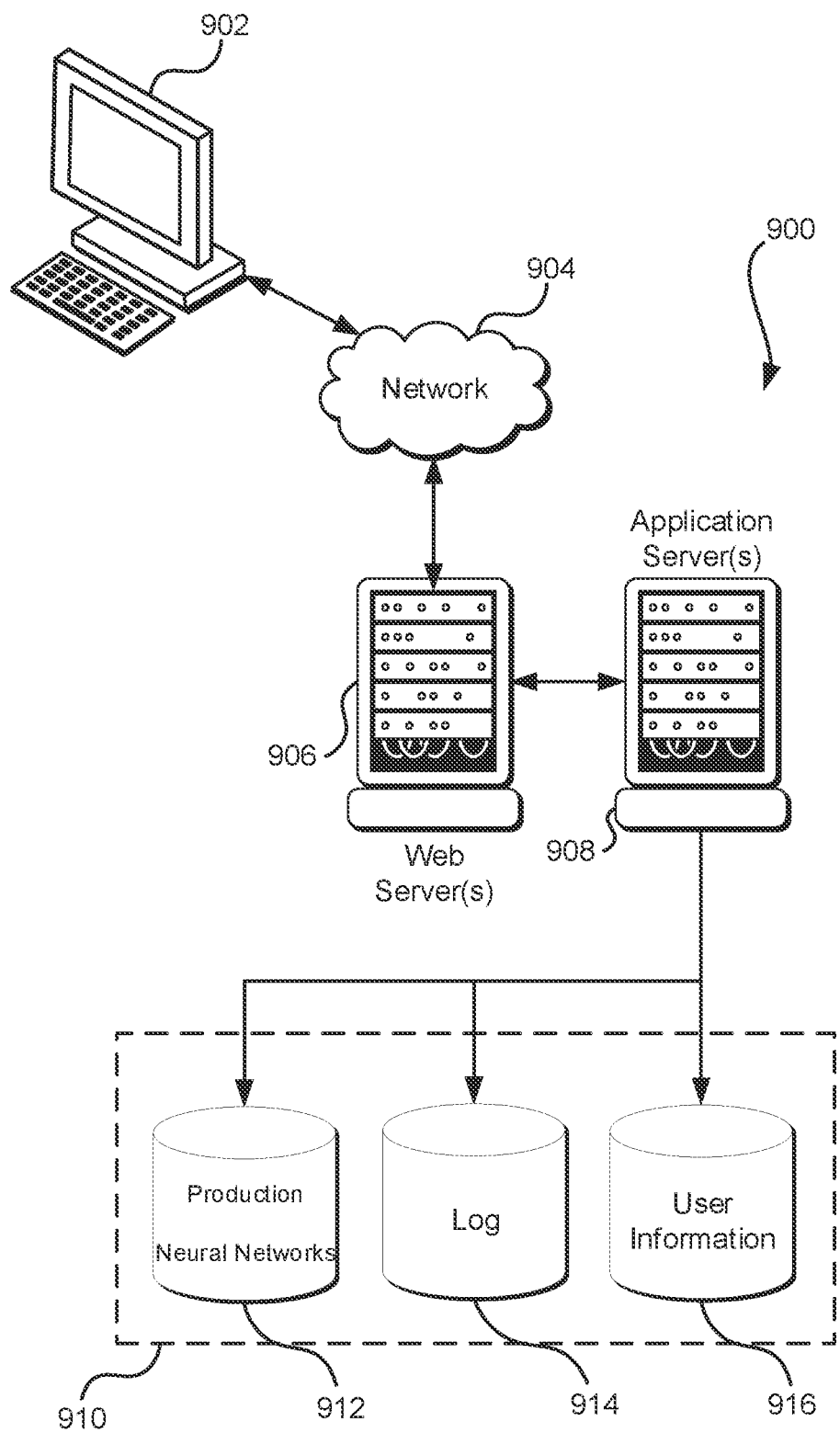
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors— for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining input data to be processed using a machine learning model, the obtained input data being in plaintext form;
    using a first portion of the machine learning model, comprising a first set of layers of a neural network, to calculate plaintext intermediate data, the first portion of the machine learning model, comprising a second set of layers of the neural network, in plaintext form and a second portion of the machine learning model in ciphertext form according to a homomorphic encryption scheme;
    using the homomorphic encryption scheme to encrypt the plaintext intermediate data to obtain ciphertext intermediate data;
    using the second portion of the machine learning model to obtain, without decrypting the ciphertext intermediate data, encrypted output data according to the homomorphic encryption scheme; and
    transmitting a request to a service to cause the service to decrypt the encrypted output data and provide corresponding plaintext output data in response to the request.

2. The computer-implemented method of claim 1, wherein the second portion of the machine learning model comprises neural network components that are individually encrypted.

3. The computer-implemented method of claim 1, wherein the method is performed by a computing device and the service runs in a trusted execution environment of the computing device.

4. A system, comprising:
    one or more processors; and
    memory that stores computer-executable instructions that are executable by the one or more processors to cause the system to:
        obtain data indicating a portion of a machine learning model, comprising a set of layers of a neural network, to encrypt;
        obtain a partially encrypted machine learning model by at least encrypting the portion of the model using a cipher of a homomorphic encryption scheme; and
        provide the partially encrypted machine learning model to a device that lacks an ability to decrypt the encrypted portion of the partially encrypted machine learning model.

5. The system of claim 4, wherein the partially encrypted machine learning model comprises a set of instructions executable by the device to cause the device to encrypt output of a first portion of the partially encrypted machine learning model to allow the encrypted output to be used as input into another portion of the machine learning model.

6. The system of claim 4, wherein the instructions further comprise instructions executable to cause the system to:
    receive a request to decrypt output of the partially encrypted machine learning model;
    decrypt the output to obtain plaintext output; and
    provide the plaintext output in response to the request.

7. The system of claim 4, wherein the instructions further comprise instructions executable to cause the system to add noise to plaintext output of the neural network to obfuscate the plaintext output.

8. The system of claim 4, wherein the data indicating the first portion of the machine learning model to encrypt is obtained via a user interface that allows a user to select one or more portions of the machine learning model to encrypt.

9. The system of claim 4, wherein the instructions further comprise instructions executable to obtain encrypted updated portions of the machine learning model from multiple devices that include the device and combine the multiple updated portions.

10. The system of claim 4, wherein the machine learning model is a neural network and wherein the encrypted portion of the model comprises one or more hidden layers of the neural network.

11. The system of claim 4, wherein the system has access to a private key of a public/private key pair and the instructions that cause the system to provide the partially encrypted machine learning model additionally cause the system to provide a public key of the public/private key pair.

12. A non-transitory computer-readable storage medium storing thereon executable instructions that, as a result of being executed by one or more processors of a computer system, cause the computer system to:
    obtain ciphertext input data based on plaintext input data, the ciphertext input data being output a cipher of a homomorphic encryption scheme;
    obtain ciphertext output data by at least applying a first portion of a machine learning model to the ciphertext input data, the machine learning model comprising the first portion with a first set of layers of a neural network, and a second portion with a second set of layers of the neural network, the first portion being encrypted according to the homomorphic encryption scheme and the second portion being in plaintext form; and
    obtain plaintext output data by causing the ciphertext output data to be decrypted.

13. The non-transitory computer-readable storage medium of claim 12, wherein the instructions that cause the computer system to obtain the plaintext output data are executable by the one or more processors to cause the computer system to transmit a request to a service to cause the service to use cryptographic material to decrypt the ciphertext output data to obtain the plaintext output data and provide the plaintext output data in response to the request.

14. The non-transitory computer-readable storage medium of claim 13, wherein the instructions that cause the computer system to obtain the plaintext output data are executable by the one or more processors to cause the computer system to cause a secure execution environment of the computer system to decrypt the ciphertext output data.

15. The non-transitory computer-readable storage medium of claim 14, wherein the plaintext output comprises inferencing output of the machine learning model.

16. The non-transitory computer-readable storage medium of claim 12, wherein the homomorphic encryption scheme is a fully homomorphic encryption scheme.

17. The non-transitory computer-readable storage medium of claim 12, wherein causing the ciphertext output data to be decrypted further comprises causing noise to be added to the plaintext output.

18. The non-transitory computer-readable storage medium of claim 12, wherein the instructions further comprise instructions executable by the one or more processors to cause the computer system to further train the machine learning model based on the plaintext output.

19. The non-transitory computer-readable storage medium of claim 12, wherein the machine learning model is comprised of a neural network with individually encrypted components, the components comprising neural network weights.

\* \* \* \* \*